(12) United States Patent
Jung

(10) Patent No.: US 11,095,810 B2
(45) Date of Patent: Aug. 17, 2021

(54) SETTING SYSTEM FOR A CAMERA AND CONTROL METHOD THEREOF

(71) Applicant: HANWHA TECHWIN CO., LTD., Seongnam-si (KR)

(72) Inventor: Hyung Ho Jung, Seongnam-si (KR)

(73) Assignee: HANWHA TECHWIN CO., LTD.

( * ) Notice: Subject to any disclaimer, the term of this patent is extended or adjusted under 35 U.S.C. 154(b) by 0 days.

(21) Appl. No.: 16/380,971

(22) Filed: Apr. 10, 2019

(65) Prior Publication Data

US 2020/0221018 A1 Jul. 9, 2020

(30) Foreign Application Priority Data

Jan. 7, 2019 (KR) ......................... 10-2019-0001825

(51) Int. Cl.
*H04N 5/232* (2006.01)
*G06F 3/0484* (2013.01)

(52) U.S. Cl.
CPC ..... *H04N 5/23216* (2013.01); *G06F 3/04847* (2013.01); *H04N 5/23229* (2013.01)

(58) Field of Classification Search
CPC ............ H04N 5/23216; H04N 5/23229; G06F 3/04847
See application file for complete search history.

(56) References Cited

U.S. PATENT DOCUMENTS

| | | | | |
|---|---|---|---|---|
| 2003/0140090 A1* | 7/2003 | Rezvani | ................... | H04L 67/06 709/203 |
| 2004/0247205 A1* | 12/2004 | Nagaya | ..................... | H04N 5/76 382/305 |
| 2011/0052155 A1* | 3/2011 | Desmarais | ......... | H04N 21/4788 386/290 |
| 2011/0126250 A1* | 5/2011 | Turner | ............... | H04N 21/4751 725/109 |
| 2015/0163345 A1* | 6/2015 | Cornaby | ............... | G06F 3/0236 345/633 |
| 2016/0105644 A1* | 4/2016 | Smith | ................ | G08B 13/1966 348/159 |

(Continued)

FOREIGN PATENT DOCUMENTS

| | | |
|---|---|---|
| KR | 10-0783561 | 12/2007 |
| KR | 10-0917849 | 9/2009 |

(Continued)

*Primary Examiner* — Lin Ye
*Assistant Examiner* — John H Morehead, III
(74) *Attorney, Agent, or Firm* — H.C. Park & Associates, PLC

(57) ABSTRACT

A setting apparatus for controlling setting profiles of a camera, the apparatus includes a storage, a display, and a processor to provide a user interface on the display having first region for setting a multi-profile of a camera registered on each of a plurality of channels and a second region for setting a reception profile of a management apparatus connected to the camera on each of the plurality of channels; recommend a candidate profile set settable to a camera registered on a first channel, to a first region of the first channel, and set a multi-profile for the camera registered on the first channel; and provide a multi-profile of the first channel to a first region of at least one other channel as a candidate profile set of a camera registered on the at least one other channel that is different from the first channel.

18 Claims, 14 Drawing Sheets

(56) References Cited

U.S. PATENT DOCUMENTS

2016/0301866 A1 10/2016 Kim et al.
2017/0132811 A1* 5/2017 Yamaki ................ G06T 11/001
2020/0029133 A1* 1/2020 Gehlsen ............ H04N 21/8549

FOREIGN PATENT DOCUMENTS

KR   10-2016-0121145   10/2016
KR   10-2018-0013264   2/2018

* cited by examiner

FIG. 6

| PROFILE | CODEC | RESOLUTION | FRAME RATE | BIT RATE TYPE | BIT RATE | BIT RATE RANGE |
|---|---|---|---|---|---|---|
| #1 (MJPEG) | MJPEG | 1920X1080 ☑ | 2 ☑ | — | 6144 | 2048~6144 Kbps |
| #2 (H.264) | H.264 | 1920X1080 ☑ | 30 ☑ | CBR ☑ | 20480 | 1024~20480 Kbps |
| #3 (H.265) | H.265 | 1920X1080 ☑ | 5 ☑ | — | 5000 | 2048~30720 Kbps |
| #4 (Live4NVR) | H.264 | 800X600 ☑ | 30 ☑ | VBR ☑ | 1024 | 512~30720 Kbps |
| #5 (Rec4NVR) | H.264 | 1920X1080 ☑ | 30 ☑ | VBR ☑ | 2048 | 64~30720 Kbps |
| #6 (Rofile 1) | H.264 | 1920X1080 ☑ | 30 ☑ | VBR ☑ | 2048 | 1024~30720 Kbps |
| #7 (Rofile 2) | MJPEG | 1920X1080 ☑ | 30 ☑ | — | 10240 | 2048~30720 Kbps |
| #8 (Rofile 3) | MJPEG | 1920X1080 ☑ | 30 ☑ | — | 10240 | 2048~30720 Kbps |
| #9 (Rofile 4) | H.264 | 1920X1080 ☑ | 30 ☑ | VBR ☑ | 2560 | 1536~30720 Kbps |
| #10 (MOBILE) | MJPEG | 320X240 ☑ | 3 ☑ | — | 2048 | 256~30720 Kbps |

FIG. 7B

| CHA NNEL | ☐ | PROFILE | CODEC | RESOLUTION | FRAME RATE | BIT RATE TYPE | BIT RATE | BIT RATE RANGE | OTHERS | |
|---|---|---|---|---|---|---|---|---|---|---|
| 1 |   | #1(MJPEG) | MJPEG | 1280X1024 | 3 | – | 2024 | 64~6144Kbps | LIVE | AUTO |
|   |   | #2(H.264) | H.264 | 1920X1080 | 30 | CBR | 2352 | 64~30720Kbps |   |   |
|   | ☑ | #3(Live4NVR) | H.264 | 600X600 | 30 | VBR | 1024 | 64~30720Kbps | RECORDING | #3 |
|   | ☑ | #4(Rec4NVR) | H.264 | 1920X1080 | 30 | CBR | 2048 | 64~30720Kbps |   |   |
|   | ☑ | #5(Profile1) | H.264 | 1280X1024 | 15 | VBR | 2024 | 64~30720Kbps | LIVE STREAMING | #4 |
|   | ☑ | #10(MOBILE) | MJPEG | 320X240 | 3 | – | 300 | 64~30720Kbps |   |   |
| 2 |   |   |   |   |   |   |   |   | LIVE |   |
|   |   |   |   |   |   |   |   |   | RECORDING |   |
|   |   |   |   |   |   |   |   |   | LIVE STREAMING |   |
| 3 |   |   |   |   |   |   |   |   | LIVE |   |
|   |   |   |   |   |   |   |   |   | RECORDING |   |
|   |   |   |   |   |   |   |   |   | LIVE STREAMING |   |
| ⋮ |   |   |   |   | ⋮ |   |   |   |   |   |
| 10 |   |   |   |   |   |   |   |   | LIVE |   |
|   |   |   |   |   |   |   |   |   | RECORDING |   |
|   |   |   |   |   |   |   |   |   | LIVE STREAMING |   |

Profile side panel: AUTO, #1, #2, #3, ⋮, #9, #10

FIG. 7C

| CHA NNEL | ☐ | PROFILE | CODEC | RESOLUTION | | FRAME RATE | | BIT RATE TYPE | | BIT RATE | BIT RATE RANGE | OTHERS | |
|---|---|---|---|---|---|---|---|---|---|---|---|---|---|
| 1 | | #1(MJPEG) | | | ▽ | 3 | ▽ | – | | 2024 | 64~6144Kbps | LIVE | AUTO |
| | | #2(H.264) | | | ▽ | 30 | ▽ | CBR | ▽ | 2352 | 64~30720Kbps | | |
| | ☑ | #3(Live4NVR) | H.264 | 600X600 | ▽ | 30 | ▽ | VBR | ▽ | 1024 | 64~30720Kbps | RECORDING | #3 |
| | ☑ | #4(Rec4NVR) | H.264 | 1920X1080 | ▽ | 30 | ▽ | CBR | ▽ | 2048 | 64~30720Kbps | | |
| | ☑ | #5(Profile1) | H.264 | 1280X1024 | ▽ | 15 | ▽ | VBR | ▽ | 2024 | 64~30720Kbps | LIVE STREAMING | #4 |
| | ☑ | #10(MOBILE) | MJPEG | 320X240 | ▽ | 3 | ▽ | – | | 300 | 64~30720Kbps | | |
| 2 | | | | | | | | | | | | LIVE | |
| | | | | | | | | | | | | RECORDING | |
| | | | | | | | | | | | | LIVE STREAMING | |
| 3 | | | | | | | | | | | | LIVE | |
| | | | | | | | | | | | | RECORDING | |
| | | | | | | | | | | | | LIVE STREAMING | |
| ⋮ | | | | ⋮ | | | | | | | | | |
| 10 | | | | | | | | | | | | LIVE | |
| | | | | | | | | | | | | RECORDING | |
| | | | | | | | | | | | | LIVE STREAMING | |

350: 351 [+], 352 [🗑], 353 [✓]

309A / 359

PROFILE: AUTO, #1, #2, #3, ⋮, #9, #10

| CHANNEL | SELECT ☐ | PROFILE | CODEC | RESOLUTION | FRAME RATE | BIT RATE TYPE | BIT RATE | BIT RATE RANGE | OTHERS | |
|---|---|---|---|---|---|---|---|---|---|---|
| 1 | | #1(MJPEG) | MJPEG | 1280X1024 | 3 | – | 2024 | 64~6144Kbps | LIVE | AUTO |
| | | #2(H.264) | H.264 | 1920X1080 | 30 | CBR | 2352 | 64~30720Kbps | | |
| | ☐ | #3(Live4NVR) | H.264 | 800X600 | 30 | VBR | 1024 | 64~30720Kbps | RECORDING | #3 |
| | ☐ | #4(Rec4NVR) | H.264 | 1920X1080 | 30 | CBR | 2048 | 64~30720Kbps | | |
| | ☐ | #5(Profile1) | H.264 | 1280X1024 | 15 | VBR | 2024 | 64~30720Kbps | LIVE STREAMING | #4 |
| | ☐ | #10(MOBILE) | MJPEG | 320X240 | 3 | – | 300 | 64~30720Kbps | | |
| 2 | ☑ | #1(MJPEG) | MJPEG | 1280X1024 | 3 | – | 2024 | 64~6144Kbps | LIVE | |
| | | #2(H.264) | H.264 | 1920X1080 | 30 | CBR | 2352 | 64~30720Kbps | | |
| | ☐ | #3(Live4NVR) | H.264 | 800X600 | 30 | VBR | 1024 | 64~30720Kbps | RECORDING | |
| | ☐ | #4(Rec4NVR) | H.264 | 1920X1080 | 30 | CBR | 2048 | 64~30720Kbps | | |
| | ☐ | #5(Profile1) | H.264 | 1280X1024 | 15 | VBR | 2024 | 64~30720Kbps | LIVE STREAMING | |
| | ☐ | #10(MOBILE) | MJPEG | 320X240 | 3 | – | 300 | 64~30720Kbps | | |
| 3 | ☑ | #1(MJPEG) | MJPEG | 1280X1024 | 3 | – | 2024 | 64~6144Kbps | LIVE | |
| | | #2(H.264) | H.264 | 1920X1080 | 30 | CBR | 2352 | 64~30720Kbps | | |
| | ☐ | #3(Live4NVR) | H.264 | 800X600 | 30 | VBR | 1024 | 64~30720Kbps | RECORDING | |
| | ☐ | #4(Rec4NVR) | H.264 | 1920X1080 | 30 | CBR | 2048 | 64~30720Kbps | | |
| | ☐ | #5(Profile1) | H.264 | 1280X1024 | 15 | VBR | 2024 | 64~30720Kbps | LIVE STREAMING | |
| | ☐ | #10(MOBILE) | MJPEG | 320X240 | 3 | – | 300 | 64~30720Kbps | | |
| 10 | ☑ | #1(MJPEG) | MJPEG | 1280X1024 | 3 | – | 2024 | 64~6144Kbps | LIVE | |
| | | #2(H.264) | H.264 | 1920X1080 | 30 | CBR | 2352 | 64~30720Kbps | | |
| | ☐ | #3(Live4NVR) | H.264 | 800X600 | 30 | VBR | 1024 | 64~30720Kbps | RECORDING | |
| | ☐ | #4(Rec4NVR) | H.264 | 1920X1080 | 30 | CBR | 2048 | 64~30720Kbps | | |
| | ☐ | #5(Profile1) | H.264 | 1280X1024 | 15 | VBR | 2024 | 64~30720Kbps | LIVE STREAMING | |
| | ☐ | #10(MOBILE) | MJPEG | 320X240 | 3 | – | 300 | 64~30720Kbps | | |

PROFILE: AUTO, #1, #2, #3, ... #9, #10

FIG. 10

SETTING SYSTEM FOR A CAMERA AND CONTROL METHOD THEREOF

CROSS-REFERENCE TO RELATED APPLICATION

This application claims priority from and the benefit of Korean Patent Application No. 10-2019-0001825, filed on Jan. 7, 2019, which is hereby incorporated by reference for all purposes as if fully set forth herein.

BACKGROUND

Field

Exemplary implementations of the invention relate to a setting apparatus for setting a camera and/or a management apparatus and a control method thereof.

Discussion of the Background

Multi-profile network transmission is becoming common in security cameras. Security cameras may provide the function of transmitting videos according to their purpose, so that high-resolution videos are used for storage or enlarged monitoring screens, and low-resolution videos are used for mobile devices or monitoring of multi-split modes. Since network security cameras are connected via networks, multiple users may request necessary profiles at the same time and obtain desired videos.

The above information disclosed in this Background section is only for understanding of the background of the inventive concepts, and, therefore, it may contain information that does not constitute prior art.

SUMMARY

Setting systems constructed according to exemplary implementations of the invention and control methods therefor are capable of setting profiles of a camera and a management apparatus in an easy and convenient manner.

Additional features of the inventive concepts will be set forth in the description which follows, and in part will be apparent from the description, or may be learned by practice of the inventive concepts.

According to one or more embodiments, a setting system for a camera includes a storage, a display, and a processor to: provide a user interface on the display, the user interface having a first region for setting a multi-profile of a camera registered on each of a plurality of channels and a second region for setting a reception profile of a management apparatus connected to the camera on each of the plurality of channels; recommend a candidate profile set, which is settable to a camera registered on a first channel selected from among the plurality of channels, to a first region of the first channel, and set a multi-profile for the camera registered on the first channel, the multi-profile being determined as a result of editing profiles constituting the candidate profile set; and provide a multi-profile of the first channel to a first region of at least one other channel as a candidate profile set of a camera registered on the at least one other channel that is different from the first channel.

The processor may be further configured to provide, to the user interface, a function of copying and pasting a multi-profile displayed in the first region of the first channel to a first region of the at least one other channel.

The user interface may include a third region for providing a profile set, and the processor may be further configured to provide, to the user interface, a function of copying and pasting a profile, which is selected from among the profile set provided in the third region, to the second region.

The processor may be further configured to: display an identification mark on a non-supported profile not supported by the camera registered on the at least one other channel, the non-supported profile being among the profiles constituting the candidate profile set displayed in the first region of the at least one other channel; and change at least one value of attributes of the non-supported profile to a minimum value in response to a user request.

The processor may be further configured to provide information of a camera registered on a channel selected from among the plurality of channels.

The processor may be further configured to provide, to the user interface, a preview image to which a profile selected from among the profiles constituting the candidate profile set is applied.

The user interface may include a fourth area for providing a folder set capable of temporarily storing the profile set, and the processor may be further configured to provide, to the user interface, a function of copying and pasting a profile set selected in the first region to a folder selected from among the folder set.

The processor may be further configured to provide, to the user interface, a function of copying and pasting the profile set, which is temporarily stored in the folder selected from among the folder set, to the first region of the at least one other channel.

The processor may be further configured to recommend, based on capability information of the cameras registered on the plurality of channels, at least one other channel to which the candidate profile set recommended to the first channel is applicable.

According to one or more embodiments, a method of controlling setting of a device, the method being performed by a setting system, includes the steps of: providing a user interface on a display, the user interface having a first region for setting a multi-profile of a camera registered on each of a plurality of channels and a second region for setting a reception profile of a management apparatus connected to the camera on each of the plurality of channels; recommending a candidate profile set, which is settable to a camera registered on a first channel selected from among the plurality of channels, to a first region of the first channel, and setting a multi-profile for the camera registered on the first channel, the multi-profile being determined as a result of editing profiles constituting the candidate profile set; and providing a multi-profile of the first channel to a first region of at least one other channel as a candidate profile set of a camera registered on the at least one other channel that is different from the first channel.

The step of providing of the multi-profile of the first channel to the first region of the at least one other channel as the candidate profile set may include the step of providing the multi-profile of the first channel to the first region of the at least one other channel as the candidate profile set in response to a request for a function of copying and pasting a multi-profile displayed in the first region of the first channel to the first region of the at least one other channel.

The user interface may include a third region for providing a profile set, and the method may further include the step of setting a reception profile of the management apparatus in response to a function of copying and pasting a profile, which is selected from among a profile set provided in the third region, to the second region.

The method may further include the steps of: displaying an identification mark on a non-supported profile not supported by the camera registered on the at least one other channel, the non-supported profile being among the profiles constituting the candidate profile set displayed in the first region of the at least one other channel; and changing at least one value of attributes of the non-supported profile to a minimum value.

The method may further include the step of providing information, overlapped on the user interface, of a camera registered on a channel selected from among the plurality of channels.

The method may further include the step of providing a preview image to which a profile selected from among the profiles constituting the candidate profile set is applied.

The user interface may include a fourth area for providing a folder set capable of temporarily storing the profile set, and the method may further include temporarily storing a profile set, which is selected in the first region, in a folder, which is selected from among the folder set, in response to a request for a function of copying and pasting the selected profile set to the selected folder.

The method may further include the step of providing the profile set, which is temporarily stored in the folder selected from among the folder set, to the first region of the at least one other channel in response to a request for a function of copying and pasting the temporarily stored profile set to the first region of the at least one other channel.

The method may further include the step of recommending, based on capability information of the cameras registered on the plurality of channels, at least one other channel to which the candidate profile set recommended to the first channel is applicable.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 6 illustrates an example of a multi-profile that is set in a second region of a setting UI, according to an exemplary embodiment;

FIGS. 7A, 7B, 7C, 7D, and 7E illustrate examples of multi-profile settings of a camera and reception profile settings of a management apparatus using a setting UI, according to an exemplary embodiment; and FIGS. 8, 9, and 10 illustrate examples of multi-profile settings using a setting UI, according to another exemplary embodiment.

DETAILED DESCRIPTION

Figure 1:
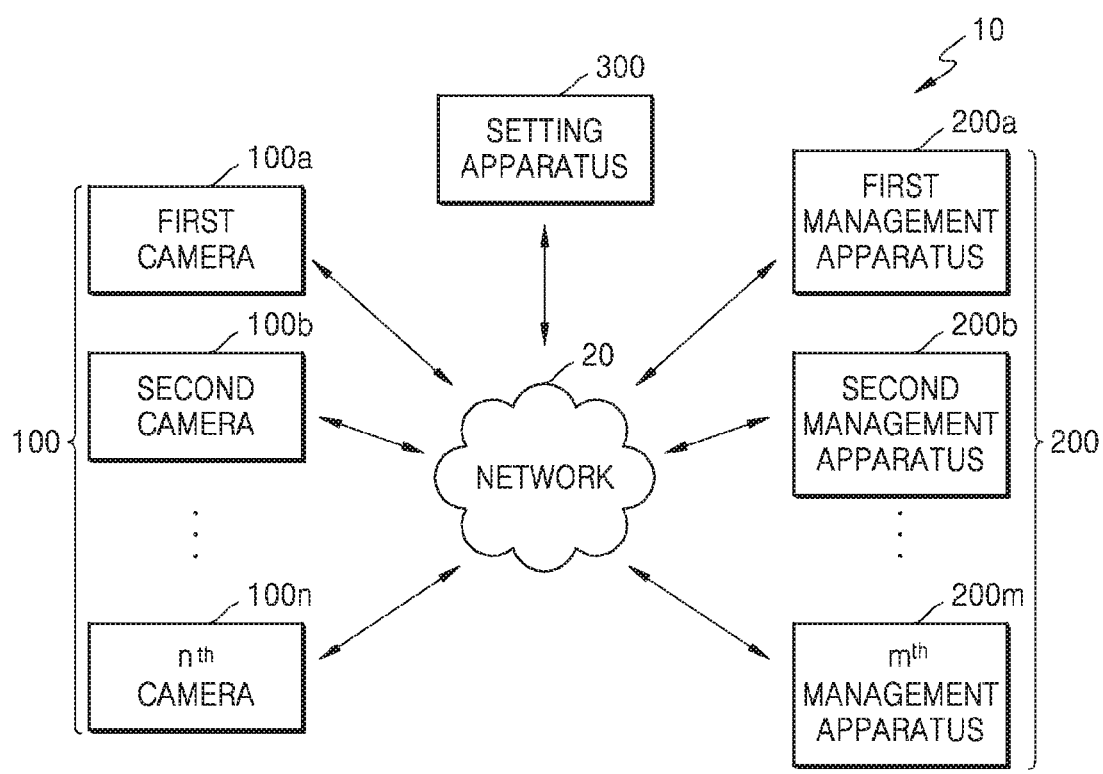
FIG. 1 is a block diagram of a security system constructed according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments will be described in detail with reference to the accompanying drawings.

Figure 2:
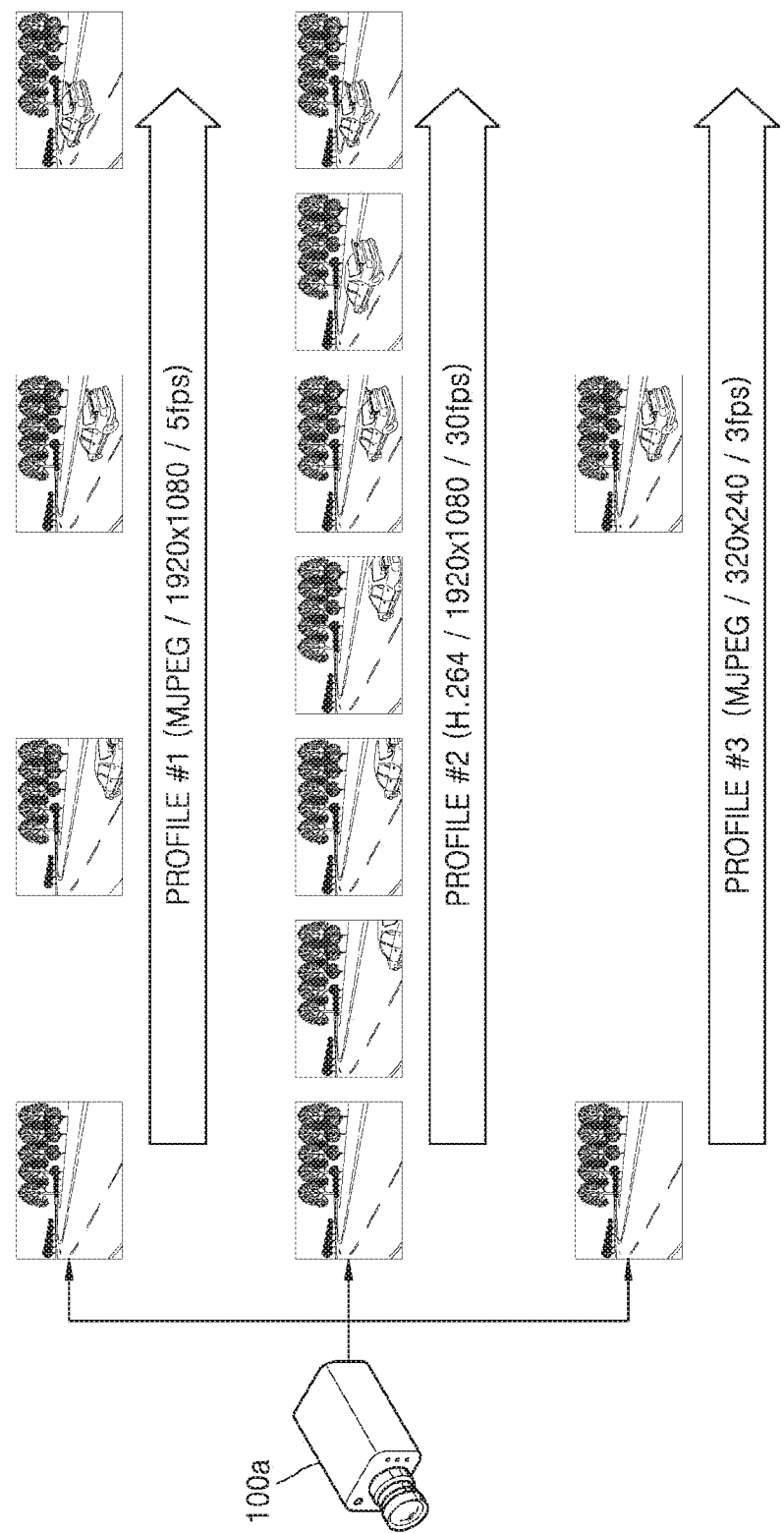
FIG. 2 is a schematic diagram illustrating an example of a multi-profile according to an exemplary embodiment.

FIG. 1 is a block diagram of a security system 10 according to an exemplary embodiment. FIG. 2 is a diagram illustrating an example of a multi-profile according to an exemplary embodiment.

Referring to FIG. 1, the security system 10 according to the illustrated embodiment may include a camera 100, a management apparatus 200, and a setting apparatus 300. The camera 100, the management apparatus 200, and the setting apparatus 300 may be connected via a wired and/or wireless network 20. The network 20 may include an Internet, a wide area network (WAN), a local area network (LAN), a telephone network, a direct connection communication, and/or the like. The network 20 may employ a wired and/or wireless communication scheme.

The camera 100 may be installed inside and outside of offices, homes, hospitals, banks, and public buildings requiring security, and may be used for access control or crime prevention. The camera 100 may have various shapes, such as a straight shape or a dome shape, according to the installation place and purpose of use. The camera 100 may include a single fixed camera disposed at a fixed position in a specific place and having a fixed capturing range, or a PTZ camera having a pan/tilt/zoom function. The camera 100 may include a surveillance camera, a portable camera, a camcorder, and/or the like. The surveillance camera may include a visual camera, a thermal camera, a special purpose camera, and/or the like. The camera 100 may include first to $n^{th}$ cameras 100a to 100n.

The camera 100 may encode a video by applying one or more profiles (hereinafter, referred to as "multi-profile"). The video may include an image and a series of images. The camera 100 may acquire a video and encode the acquired video by using a profile of a set codec, resolution, frame rate, and bit rate. The multi-profile of the camera 100 may be set, changed, and/or added by the setting apparatus 300. Each profile of the multi-profile may be indexed. The camera 100 may receive a request for a video of a predetermined profile from the management apparatus 200 and transmit the video of the corresponding profile to the management apparatus 200. The multi-profile may include at least one fixed profile, at least one predefined profile, and at least one user-defined profile.

The fixed profile is a profile provided by the camera 100 as a default. The fixed profile is a profile based on a codec supported by the camera 100, such as MJPEG, H.264, or H.265. When a user does not specify a profile, the fixed profile may be automatically applied to video encoding.

The predefined profile is a profile that predefines a profile suitable for a video to be received by the management apparatus 200 according to characteristics of the management apparatus 200 that receives the video. The predefined profile may include, for example, a recording (storage) profile, a monitoring screen output and/or web viewer live profile, a mobile device profile, and/or the like.

The recording profile is a profile applied when recording a video in a micro SD card or a network attached storage (digital video recorder (DVR), network video recorder (NVR), and/or the like). The live profile is a profile applied when outputting a real-time video (live video) on a monitoring screen connected to a DVR or a NVR and/or when outputting a real-time video (live video) on a web viewer such as a personal computer or a central management system (CMS). The mobile device profile is a profile applied when outputting a video in the mobile device. For example, the recording profile may include H.264/8M(3264×2488)/30 fps, the monitoring screen output live profile may include H.264/800×600/15 fps or 30 fps, the web viewer live profile may include H.264/1280×720/15 fps, and the mobile device profile may include MJPEG/320×240/3 fps.

The user-defined profile is a profile that may be generated and operated by a user. The user may generate a profile by selecting one of the codecs supported by the camera 100 and setting attributes (detailed conditions) to be applied to the codec, such as a resolution, a frame rate, and a bit rate. The maximum settable values of the resolution, the frame rate, and the bit rate may change according to a codec type.

The user may change the resolution, the frame rate, and the bit rate, which are the detailed conditions of the codecs set to the fixed profile and the predefined profile. The maximum settable values of the resolution, the frame rate, and the bit rate may change according to a codec type.

The camera 100 may transmit a video to the management apparatus 200. For example, as illustrated in FIG. 2, a first camera 100a may provide a first video encoded with a first profile (profile #1) to a first management apparatus 200a, may provide a second video encoded with a second profile (profile #2) to a second management apparatus 200b, and may provide a third video encoded with a third profile (profile #3) to a third management apparatus 200c.

The camera 100 may transmit two or more videos to one management apparatus 200. For example, the first camera 100a may provide, to the second management apparatus 200b, the second video encoded with the second profile (profile #2) and the third video encoded with the third profile (profile #3).

In this manner, the camera 100 may encode videos with the multi-profile and transmit the encoded videos, and the plurality of management apparatuses 200 may simultaneously access, request, and receive the video of one profile. The camera 100 may transmit videos in a unicast or multicast scheme.

The camera 100 may detect an object in an acquired video. The camera 100 may detect an object by applying an object detection algorithm to the entire video or a part of the video (region of interest). The camera 100 may track the detected object and/or identify the object.

The camera 100 may transmit a real-time alarm to the registered management apparatus 200 when an event occurs, and may store an event video. The camera 100 may transmit video, metadata, and/or event data to the management apparatus 200.

The management apparatus 200 may be disposed spatially apart from the camera 100 and may be connected to the camera 100 via the network 20 in a wired and/or wireless manner. The management apparatus 200 may request the video from the camera 100. The management apparatus 200 may receive the video from the camera 100, provide the received video to the display, and monitor the videos being displayed. The management apparatus 200 may be connected to one or more cameras 100. The management apparatus 200 may perform object identification, object search, and/or the like based on the video, the metadata, and/or the event data from the camera 100.

The management apparatus 200 may include first to $m^{th}$ management apparatuses 200a to 200m. The management apparatus 200 may include a DVR or a NVR that stores videos. The management apparatus 200 may include a personal computer, a CMS, a mobile device, a server, or other types of computing device. The mobile device may include a smart phone, a tablet, a handheld device, and/or the like.

The setting apparatus 300 may set the functions related to the profiles of the camera 100 and the management apparatus 200. In FIG. 1, the setting apparatus 300 may be separated from the camera 100 and the management apparatus 200 and may be connected to the network 20 separately from the camera 100 and the management apparatus 200. In another exemplary embodiment, the setting apparatus 300 may be implemented as a part of the camera 100 or a part of the management apparatus 200.

Figure 3:
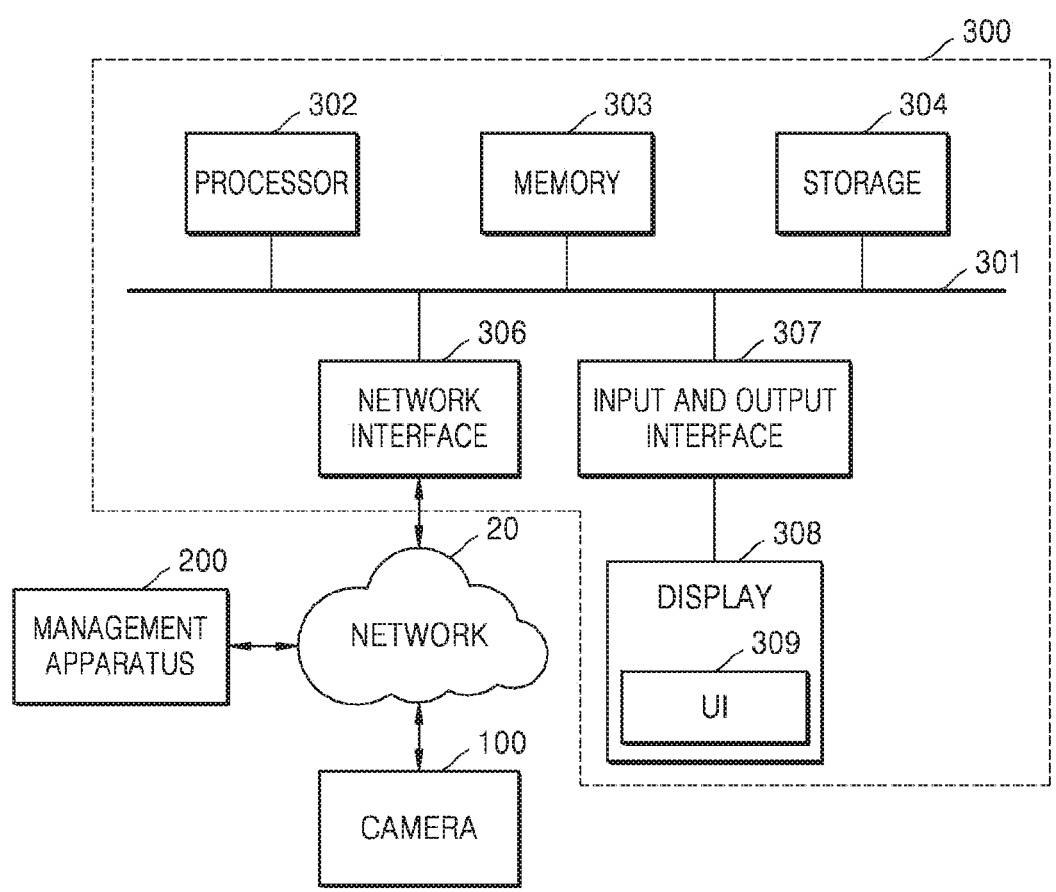
FIG. 3 is a schematic block diagram of a setting apparatus constructed according to an exemplary embodiment.

FIG. 3 is a schematic block diagram of the setting apparatus 300 according to an exemplary embodiment.

Referring to FIG. 3, the setting apparatus 300 may include a processor 302, a memory 303, and a storage 304, which communicate with each other or other elements via a bus 301. Each of the elements may be connected to the bus 301 directly or through one or more interfaces or adapters. The bus 301 may include a memory bus, a memory controller, a peripheral bus, a local bus, and any combination thereof.

The processor 302 may include any number of hardware and/or software configurations that perform specific functions. For example, the processor 302 may refer to, for example, a data processor that is embedded in hardware and includes a circuit physically configured to perform functions expressed by codes or commands included in a program. Examples of the data processor embedded in the hardware may include a microprocessor, a central processing unit (CPU), a processor core, a multiprocessor, an application-specific integrated circuit (ASIC), and a field programmable gate array (FPGA), but one or more exemplary embodiments are not limited thereto. The processor 302 may execute instructions (or software modules) written to a computer-readable storage medium, such as the memory 303 and/or the storage 304. The computer-readable storage medium may store software modules that implement specific exemplary embodiments, and the processor 302 may execute the stored software modules. The processor 302 may generate a setting user interface (UI) 309 for communicating with a user, and may provide and display the setting UI 309 on the display 308.

The memory 303 may include a random access memory (RAM), a read-only memory (ROM), and a combination thereof. The memory 303 may include a basic input output systems (BIOS) (or firmware) having basic routines necessary for booting in the setting apparatus 300.

The storage 304 may be a mass storage including a hard disk drive, an optical disk drive, a solid-state memory device (SSD), and/or the like. The storage 304 may store an operating system, executable files (EXEC), data, an application such as a web browser, program modules, and/or the like. The setting apparatus 300 may communicate with the camera 100 and/or the management apparatus 200 connected to the network 20 via a network interface 306. In one exemplary embodiment, the camera 100, the management apparatus 200, and the setting apparatus 300 may communicate with each other by an Open Network Video Interface Forum (ONVIF) protocol. The setting apparatus 300 may transmit, to the camera 100 and the management apparatus 200, setting data for setting the functions and operations of the camera 100 and the management apparatus 200 via the network interface 306. The network interface 306 may include a network interface card, a modem, and/or the like.

The setting apparatus 300 may include an input device and an output device connected via an input interface and an output interface (input and output interface) 307. The input and output interface 307 may include a serial port, a parallel port, a game port, a universal serial bus (USB), and/or the like.

Examples of the input device may include a key pad, a dome switch, a touch pad (for example, a touch-type capacitive touch pad, a pressure-type resistive touch pad, an infrared beam sensing type touch pad, a surface acoustic wave type touch pad, an integral strain gauge type touch pad, a piezo effect type touch pad, and/or the like), a mouse, a remote controller, a jog wheel, and a jog switch, and/or the like. The input device may be connected to the bus 301 via the input interface 307. The user may input commands and/or information to the setting apparatus 300 via the input device.

The output device may include an audio speaker, a printer, the display 308, and/or the like. The output device may be connected to the bus 301 via the output interface 307.

The execution result of the software module by the processor 302 may be displayed on the display 308. Examples of the display 308 include a liquid crystal display (LCD), an organic liquid crystal display (OLED), a cathode ray tube (CRT), and a plasma display panel (PDP), and/or the like. The display 308 may be connected to the bus 301 via the input and output interface 307. The display 308 may be provided in the form of a touch screen so as to receive an input through a user's touch and output a result, and thus, may be operated as the input device and the output device.

Figure 4:
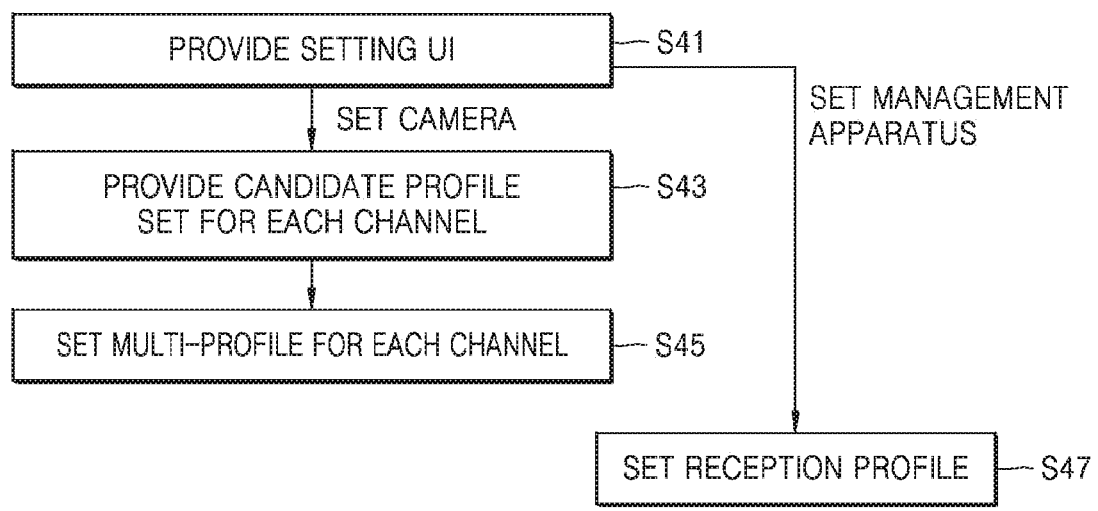
FIG. 4 is a flowchart of a camera setting control method performed by a setting apparatus, according to an exemplary embodiment.
Figure 5:
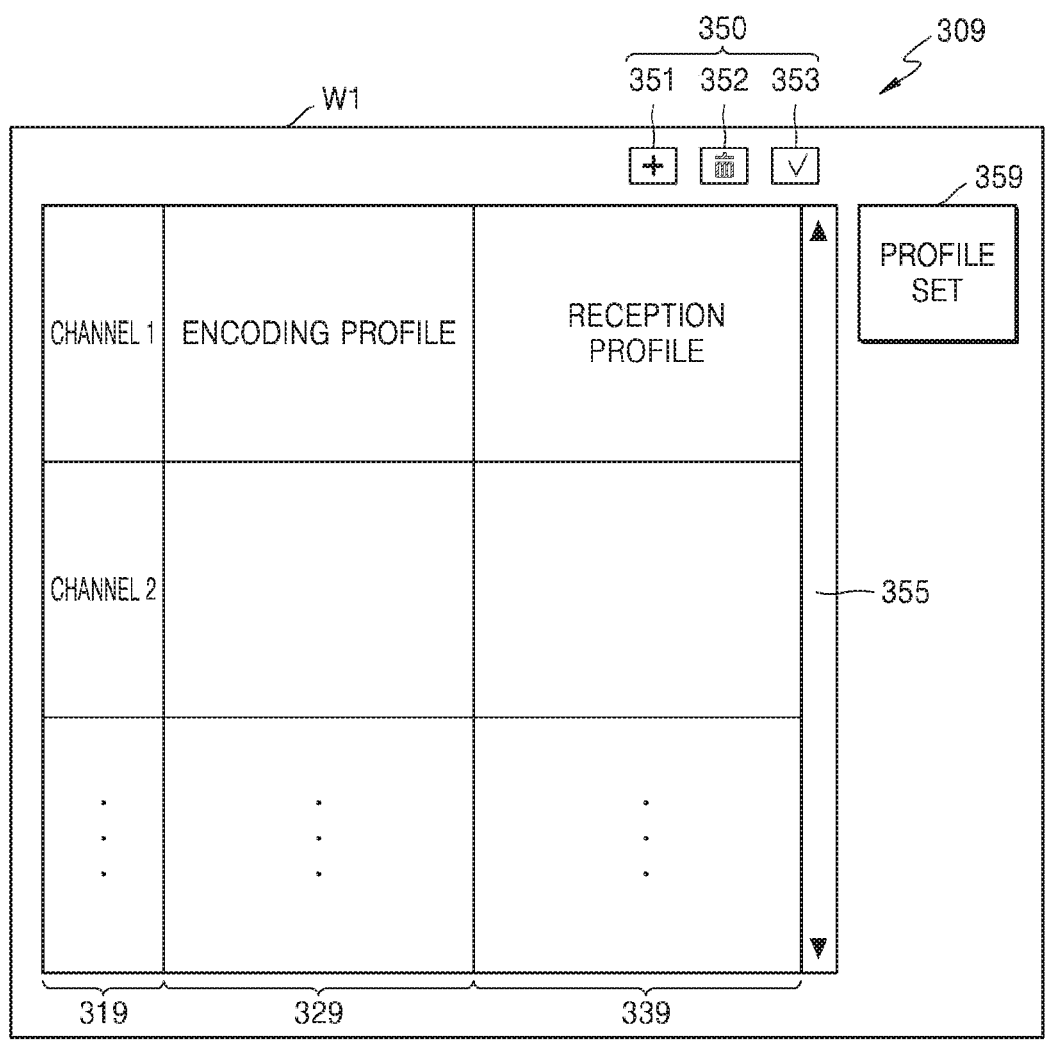
FIG. 5 is a schematic diagram of a setting user interface (UI) according to an exemplary embodiment.

FIG. 4 is a flowchart of a method performed by the setting apparatus 300 to control setting of the camera 100 and the management apparatus 200, according to an exemplary embodiment. FIG. 5 is a schematic diagram of the setting UI 309 according to an exemplary embodiment.

Referring to FIG. 4, in operation S41, the setting apparatus 300 may provide a setting UI 309 for setting the profiles of the camera 100 and/or the management apparatus 200 on a connected display screen. The user may control the profile setting of the camera 100 and/or the management apparatus 200 by using the setting UI 309.

Referring to FIG. 5, the setting UI 309 provided on the display screen may include a first region 319 for displaying channel information in a window W1, a second region 329 for setting the multi-profile of the camera 100 for each channel, a third region 339 for setting a reception profile of the management apparatus 200, and a fourth region 359 for providing a profile set. The window W1 may further include a scroll bar 355 so as to set profiles on one screen with respect to a plurality of channels while vertically moving the channels. The window W1 may include one or more graphic elements 350 that provide a predetermined function. The one or more graphic elements 350 may include an add icon 351 for providing an add function, a delete icon 352 for providing a delete function, and a confirm (check) icon 353 that provides a confirm (check) function.

The first region 319 is a region in which the channels (channel 1 to channel n) connected to the network 20 are displayed. A camera is registered on each channel, and the first region 319 may provide information of the registered camera and location information of the registered camera. The user may add a channel by clicking an input device like a mouse (or touching) the add icon 351, or may delete a channel by clicking an input device (or touching) the delete icon 352.

The second region 329 is a region for setting the profile of the camera 100. The user may set the multi-profile to be applied to video encoding of the camera 100 in the second region 329. In the second region 329, at least one piece of profile information that is preset in the camera 100 may be provided as a candidate profile. The user may edit the candidate profile provided to the second region 329. The user may add a profile by clicking (or touching) the add icon 351, or may delete a profile by clicking (or touching) the delete icon 352.

The third region 339 is a region for setting the reception profile of the management apparatus 200. The user may set the profile of the video to be received from the camera 100 for each mode by the management apparatus 200 in the third region 339. In the third region, the basic profile information that is preset in the management apparatus 200 may be provided. The user may select a profile identifier from the profile set of the fourth region 359 and set and change a mode-specific reception profile in the third region 339. The mode may include a recording mode for receiving recording video, a live mode for receiving monitoring screen output video, a live streaming mode for receiving web viewer output video. One management apparatus 200 may be associated with one or more channels.

The fourth region 359 is a region for providing the profile set. The fourth region 359 may provide a set of profile identifiers so that the user easily selects the profile to be applied to the reception mode of the management apparatus 200 among the profiles that are set in the second region 329.

FIG. 6 illustrates an example of the multi-profile set in the second region 329, according to an exemplary embodiment. In each row of the second region 329, the identifier (#1 to #10) of the profile and the profile name (MJPEG, H.264, H.265, Live4NVR, Rec4NVR, MOBILE, Profile 1-4, and/or the like) are matched with details (attributes) of the profile, such as the codec, the resolution, the frame rate, the bit rate type, the bit rate, and the bit rate range. The bit rate type may include a fixed bit rate (CBR) or a variable bit rate (VBR). The bit rate type may not be set. In this case, the camera 100 may automatically apply the CBR or the VBR set as a default, or may selectively apply the CBR or the VBR according to a network condition. The fixed bit rate is a method of fixing a network transmission bit rate while changing picture quality and a frame rate. The variable bit rate is a method of prioritizing picture quality by changing a network transmission bit rate.

A plurality of profiles may be indexed as illustrated in FIG. 6, and identifiers may be assigned thereto. The profile identifier and/or the profile name that defines and/or identifies the profile may be automatically displayed in the first column. The profile identifier may include a number and a character such as Hangul or alphabet, which are capable of identifying the profiles. In FIG. 6, the profile identifiers sequentially expressed in numbers from the first row are displayed in ascending order. The profile name indicating the basic information of the profile may be provided together with the profile identifier. The basic information of the profile may include information about whether the profile is the fixed profile, the predefined profile, or the user-defined profile. FIG. 6 illustrates an example in which the first profile #1 to the tenth profile #10 are set in the second region 329 as the multi-profile. The first profile #1, the second profile #2, and the third profile #3 are the fixed profiles of MJPEG, H.264, and H.265 codecs, respectively. The fourth profile #4, the fifth profile #5, and the tenth profile #10 are the predefined profile. The fourth profile #4 is the live profile Live4NVR, the fifth profile #5 is the recording profile Rec4NVR, the tenth profile #10 is the mobile device profile MOBILE. The sixth to ninth profiles #6 to #9 are the user-defined profile Profile1 to Profile4. The profile name may be changed by the user.

FIG. 6 illustrates an example of ten profiles #1 to #10 set in the second region 329. The number of profiles capable of being set in the second region 329 may be one or more.

The setting UI 209 according to the exemplary embodiment provides one or more setting menus, such as a profile setting menu of the camera and/or a reception profile setting menu of the management apparatus, in one window, thereby providing the user with intuitiveness and convenience as compared with an existing UI that provides a setting menu through a plurality of steps vertically and hierarchically. In addition, since the reception profile setting of the management apparatus is set by using the profile set, the reception profile setting may be set easily and quickly.

The user may set the multi-profile of the camera 100 in the second region 329 of the setting UI 309.

The setting apparatus 300 may provide a candidate profile set for each channel in operation S43 of FIG. 4. The setting apparatus 300 may provide at least one profile as the candidate profile set in the second region 329 of the channel selected by the user. In one exemplary embodiment, the candidate profile set may be at least one profile that is preset to the camera 100. The setting apparatus 300 may access the memory of the connected camera 100, read at least one piece of profile information that is preset to the camera 100, and provide the read profile information to the second region 329. In another exemplary embodiment, the candidate profile set may include profiles recommended by the setting apparatus 300 based on capability information of the camera registered on the channel. The setting apparatus 300 may acquire the capability information of the camera in an ONVIF discovery operation and recommend at least one profile, which is settable to the camera, as a part of the candidate profile set based on the capability information of the camera. The setting apparatus 300 may recommend at least one other channel camera to which the same recommendation profile is applicable. In another exemplary embodiment, the candidate profile set may include a multi-profile that is set to another channel selected by the user.

The setting apparatus 300 may set the multi profile of the camera 100 for each channel in operation S45 of FIG. 4. In one exemplary embodiment, the user may set the multi-profile of the camera 100 by creating one or more profiles in the second region 329 for each channel. The user may edit the candidate profile set provided to the second region 329 and set the multi profile of the camera 100. The setting apparatus 300 may set the multi-profile of the camera 100 by receiving a user input, such as an attribute change, a profile deletion, or a profile addition of at least one of the profiles constituting the candidate profile set, and transmitting the received user input to the registered camera 100 of the corresponding channel.

The user may set the reception profile of the management apparatus 200 in the third region 339 of the setting UI 309.

The setting apparatus 300 may set a profile to be used for recording and/or live reproduction by the management apparatus 200 connected to the camera 100 for each channel in operation S47 of FIG. 4. The setting apparatus 300 may provide, to the third region 339, the reception mode profile preset to the management apparatus 200 for each channel. The user may change the preset reception mode profile provided to the third region 339. The user may set a profile of a video to be recorded and/or reproduced live on the management apparatus 200 in the third region 339. The setting apparatus 300 may set, to the management apparatus 200, a profile of a video to be transmitted to the management apparatus 200 by the camera 100 for recording and/or reproduction by selecting the profile (profile identifier) from the profile set of the fourth region 359, receiving the user input to be set to the third region 339, and transmitting the received user input to the management apparatus 200. Accordingly, the management apparatus 200 may request the video set as the recording profile to the camera 100 and receive the video set as the recording profile from the camera 100, and the management apparatus 200 may request the video set as the live profile to the camera 100 and receive the video set as the live profile from the camera 100.

FIGS. 7A to 7E are examples of the multi-profile setting of the camera 100 and the reception profile setting of the management apparatus 200 by using a setting UI 309A, according to an exemplary embodiment.

Figure 7A:
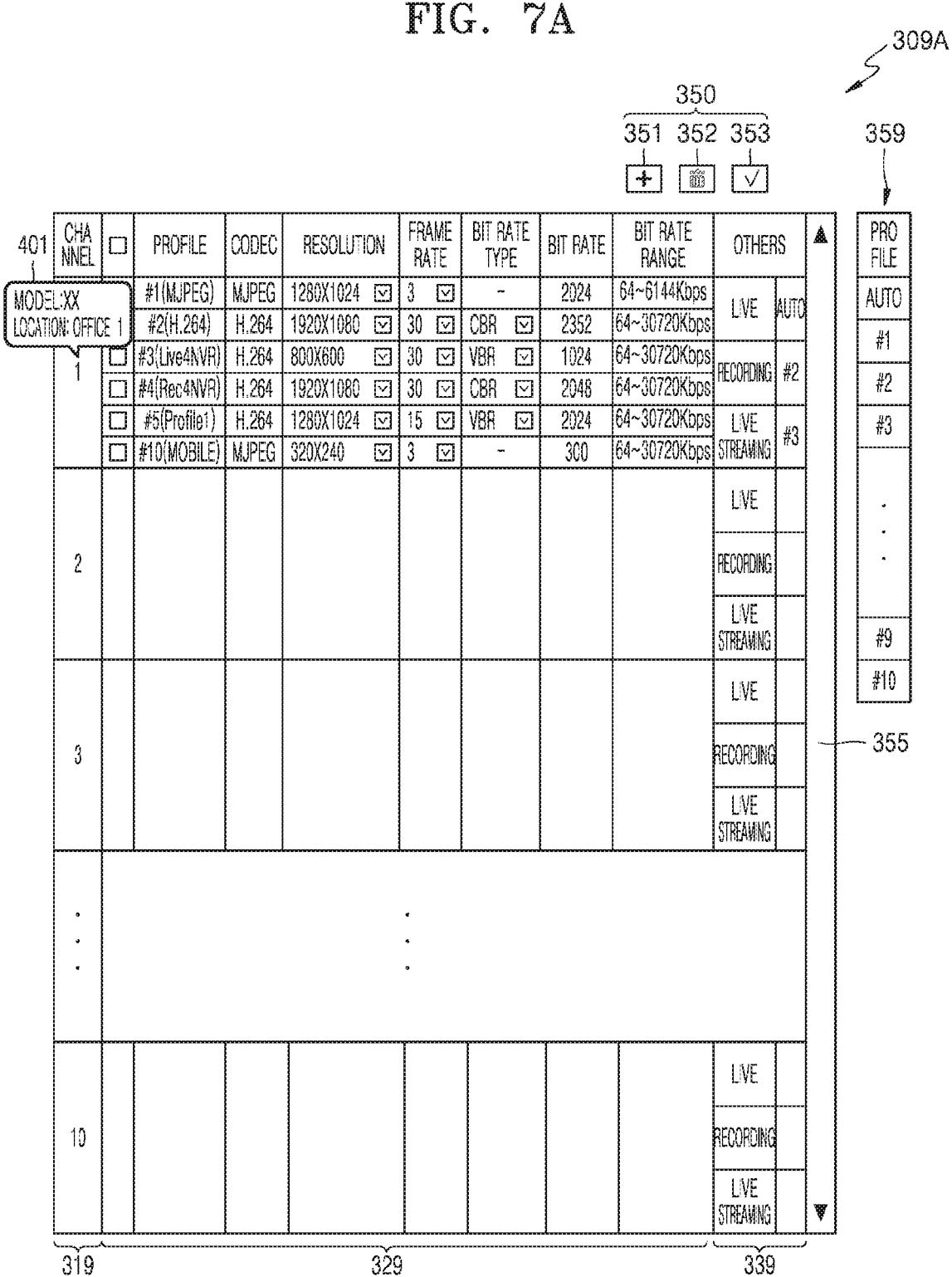

Referring to FIG. 7A, the setting UI 309A according to the exemplary embodiment may include a first region 319, a second region 329, a third region 339, and a fourth region 359. The setting UI 309A may further include one or more graphic elements 350, which provide a predetermined function, and a scroll bar 355.

The first region 319 is a region for displaying a channel connected to a network. In FIG. 7A, the first region 319 of first to tenth channels is illustrated. When the user clicks (or touches) an add icon 351 among the one or more graphic elements 350, a row for setting a profile of a new channel including the first region 319 to the third region 339 may be added to a next row of a currently displayed last row. When the user clicks (or touches) a delete icon 352 among the one or more graphic elements 350, a row including the first region 319 to the third region 339 of the selected channel may be deleted.

When the user performs a predetermined operation, such as a mouse hover operation or a predetermined number of times of click (or touch) operations, in the first region 319 of the channel, the processor 302 may perform control so that a window 401 providing information of the registered camera is overlapped and displayed on the first region 319. The information of the camera may include a camera model, a camera installation position, and/or the like.

The second region 329 is a region for setting the multi-profile of the camera 100. The multi-profile may define attributes for video encoding, such as a codec, a resolution, a frame rate, a bit rate type, a bit rate, and a bit rate range. The bit rate range may have a value automatically determined according to the codec. FIG. 7A illustrates an example in which six profiles are set in the second region 329. FIG. 7A illustrates an example in which the user accesses the camera 100 of the first channel and receives initial five profiles #1 to #4 and #10 preset to the camera 100 as the candidate profile set in the second region 329, and a profile #5 is added to a fifth row by a profile addition of a user. FIG. 7A illustrates an example in which the mobile device profile MOBILE is set as the identifier of #10 and the profile Profile1 is added to the second region 329 as the identifier of #5 in a previous row of the mobile device profile MOBILE.

The first profile #1 and the second profile #2 are fixed profiles of the MJPEG and the H.264 codec, respectively. The third profile #3 is a predefined profile of the monitoring screen output or web viewer live profile Live4NVR, the fourth profile #4 is a predefined profile of the recording profile Rec4NVR, and the tenth profile #10 is a predefined profile of the mobile device profile MOBILE. The fifth profile #5 is a user-defined profile Profile1. The user may add more profiles.

When the user performs a click (or touch) operation in the first region 319 of an arbitrary channel, a candidate profile set, which are profiles (candidate profiles) settable in the camera registered on the corresponding channel, may be displayed in the second region 329 of the corresponding channel.

When the user clicks (or touches) the add icon 351 among the graphic elements 350, a row for setting a new profile may be added to any row of the second region 329. The user may generate a user-defined profile by selecting a codec, a resolution, a frame rate, a bit rate type, a bit rate, and/or the like in the added row. The profile identifier (profile name) may be automatically displayed in the first column of the added row. The user may change the profile name. When the user clicks (or touches) the delete icon 352 among the graphic elements 350, the selected profile row may be deleted from the second region 329.

The third region 339 is a region for setting a profile of a video to be received from the camera 100 for recording and reproduction in the management apparatus 200. In one exemplary embodiment, the profiles that is preset to the management apparatus 200 may be displayed in the third region 339 on the initial screen. The user may change the profile set to the third region 339 by selecting the profile from the profile set of the fourth region 359. In another exemplary embodiment, a blank may be displayed in the third region 339 on the initial screen. When the user skips the setting of the third region 339, the basic profile that is set to the management apparatus 200 may be applied.

FIG. 7A illustrates the third region 339 for setting the monitoring screen output profile (live profile), the recording profile, and the web viewer profile (live streaming profile). The third region 339 may be configured to set the profiles to be used for one or more purposes. For example, the third region 339 may be configured to set only the recording profile.

FIG. 7A is an example in which the user accesses the management apparatus 200 of the first channel and provides, to the third region 339, the initial profiles set to the management apparatus 200. The third region 339 of FIG. 7A illustrates that the live profile is set to "auto", the recording profile is set to "#2", and the live streaming profile is set to "#3", in the management apparatus 200 connected to the camera 100 of the first channel.

The fourth region 359 is a region for providing the profile set. In the fourth region 359, icons corresponding to the identifiers of the indexed profiles may be displayed in the profile set. In FIG. 7A, numbers corresponding to the profile identifiers of the second region 329, such as #1, #2, . . . , #10, are displayed in the fourth region 359. "Auto" is a function of automatically setting the profile according to the preset setting.

Referring to FIG. 7B, when the user edits the candidate profile set displayed in the second region 329 of the first channel and then mouse-clicks (or touches) the confirm icon 353 among the graphic elements 350, the candidate profile set of the second region 329 may be set as the multi-profile of the camera 100. In another exemplary embodiment, when the user edits the candidate profile set displayed in the second region 329 of the first channel, the editing result may be automatically set as the multi-profile of the camera 100. FIG. 7B illustrates an example in which six profiles are edited and selected in the second region 329 of the first channel and six multi-profiles are set to the first channel.

In addition, the user may set and/or change a profile to be used for a specific purpose (recording and reproduction) of the management apparatus 200 in the third region 339 of the first channel. In response to a user request to copy and paste the profile identifier, which is selected in the profile set provided to the fourth region 359, to each mode of the third region 339, the processor 302 may set and/or change the profile corresponding to each mode of the third region 339. The copy and paste function may be performed by a drag and drop (D&D) operation.

When the user drags and drops the "auto" icon of the fourth region 359 to the third region 339, "auto" may be displayed in the corresponding region of the third region 339. 'Auto' may be applied for setting the monitoring screen output profile (live profile). When "auto" is set to the live profile, the management apparatus 200 may change the output video according to the number of channels output on the screen. For example, when "auto" is set to the live profile, the management apparatus 200 requests the camera 100 to transmit the video of the monitoring screen output or web viewer live profile Live4NVR in the case of a multi-channel output such as 4-channel or 16-channel video output, and may request the camera 100 to transmit the video of a profile set to the recording profile in the case of 1-channel video output. In the example of FIG. 7A, when intending to output the video live on the monitoring screen, in the case of multi-channel output, the management apparatus 200 may requests the video of the third profile #3, which is the live profile Live4NVR, to the camera 100 of the first channel and receives the video of the third profile #3 from the camera 100. In the case of 1 channel output, the management apparatus 200 may request the video of the second profile #2 set as the recording profile to the camera 100 of the first channel and receive the video of the second profile #2 from the camera 100.

When "auto" is applied only to the live profile setting, "auto" may not be applied to the corresponding region of the third region 339 even when the user drags and drops "auto" to the recording profile or the live streaming profile. In this case, the processor 302 may alarm that the "auto" setting is impossible in a separate window.

When the user drags and drops a "#3" icon of the fourth region 359 to the third region 339, "#3" may be displayed in the corresponding region of the third region 339. When the user drags and drops a "#4" icon of the fourth region 359 to the third region 339, "#4" may be displayed in the corresponding region of the third region 339.

FIG. 7B illustrates an example in which the user changes the setting of the recording profile from "#2" of FIG. 7A to "#3" and changes the setting of the live streaming profile from "#3" of FIG. 7A to "#4" in the third region 339. Accordingly, in the management apparatus 200 connected to the camera 100 of the first channel, the "third profile #3" is set as the live profile, the "third profile #3" is set as the recording profile, the "fourth profile #4" may be set as the live streaming profile.

When intending to output the video live on the monitoring screen, the management apparatus 200 may requests the video of the third profile #3, which is the live profile Live4NVR, to the camera 100 of the first channel in the case of the multi-channel output, may request the video of the third profile #3 set as the recording profile to the camera 100 of the first channel even in the case of 1 channel output, and may receive the video of the third profile #3 from the camera 100.

When intending to record the video, the management apparatus 200 may request the video of the third profile #3, which is the live profile, to the camera 100 of the first channel, and may receive the video of the third profile #3 from the camera 100. When intending to output the web viewer video live, the management apparatus 200 may request the video of the fourth profile #4, which is the recording profile, to the camera 100 of the first channel, and may receive the video of the fourth profile #4 from the camera 100.

That is, the user of the management apparatus 200 may select and receive the video of the profile that provides higher video quality or the profile that provides lower video quality, instead of the profile predefined for each purpose.

Referring to FIG. 7C, when the user selects an arbitrary profile in the second region 329, an image IM to which the corresponding profile is applied may be displayed in a preview form. The user may select the profile attribute by referring to the preview image IM before finalizing the final profile. In one exemplary embodiment, the processor 302 may generate a sample image to which the corresponding profile is applied, in response to a preview request, and provide the generated sample video in the preview form. In another exemplary embodiment, the processor 302 may search for a sample image that has been previously generated and stored by applying the corresponding profile, in response to a preview request, and provide the found sample video in a preview form.

Figure 7D:
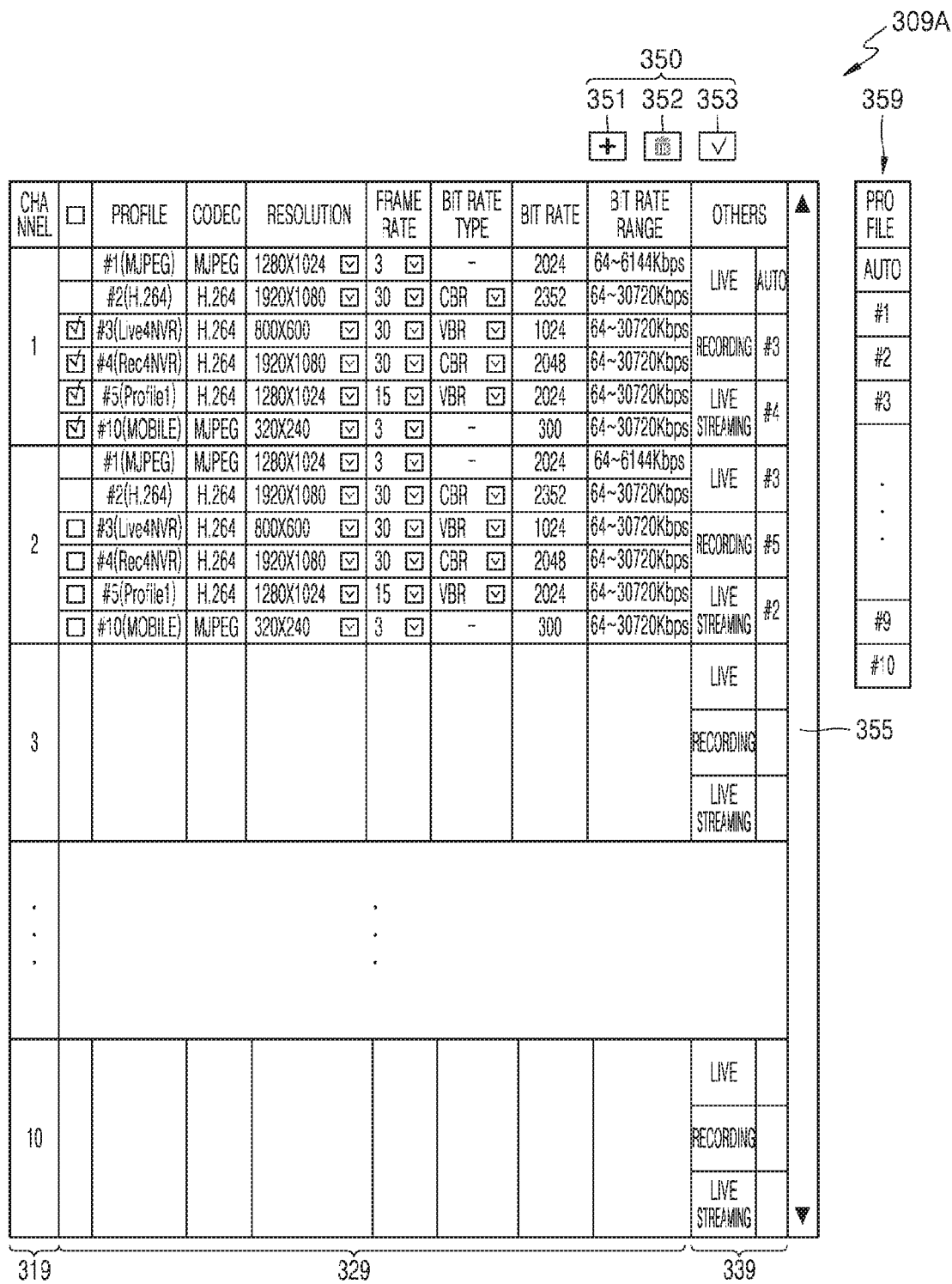

Referring to FIG. 7D, a user may use a multi-profile, which is set to an arbitrary channel, as a candidate profile set of another channel. As illustrated in FIG. 7D, in response to a user request for a copy and paste function of copying and pasting the profiles displayed in the second region 329 of the first channel to the second region 329 of the second channel, the processor 302 may provide the profiles, which are set to the camera 100 of the first channel, to the second region 329 of the second channel as the candidate profile set to be set to the camera 100 of the second channel. The copy and paste function may be performed by a drag and drop operation.

The user may edit the candidate profile set in such a manner that the profile is added or deleted by mouse-clicking (or touching) the add icon 351 or the delete icon 352 among the graphic elements 350. In addition, the user may edit the candidate profile set by selecting and changing the attributes of the candidate profile set. FIG. 7D illustrates an example in which the same multi-profile as the first channel is set to the second channel, the multi-profile that is set by the editing of the candidate profile set of the second channel may be different from the multi-profile of the first channel.

With respect to the second channel, the user may also set and/or change the profile to be used for the specific purpose (recording and reproduction) of the management apparatus 200 connected to the camera 100 of the second channel. As described with reference to FIGS. 7A and 7B, the user may selectively set and/or change the profile preset to the management apparatus 200.

FIG. 7D illustrates an example in which the "third profile #3", the "fifth profile #5", and the "second profile #2" are set to the live profile region, the recording profile region, and the live streaming profile region, respectively. When the live video is reproduced on the monitoring screen, the management apparatus 200 may request the video of the third profile #3 to the camera 100 of the first channel, and may receive the video of the third profile #3 from the camera 100. When the video is recorded, the management apparatus 200 may request the video of the fifth profile #5 to the camera 100 of the second channel, and may receive the video of the fifth profile #5 from the camera 100. When the live video is reproduced in the web viewer, the management apparatus 200 may request the video of the second profile #2 to the camera 100 of the second channel, and may receive the video of the second profile #2 from the camera 100.

Figure 7E:
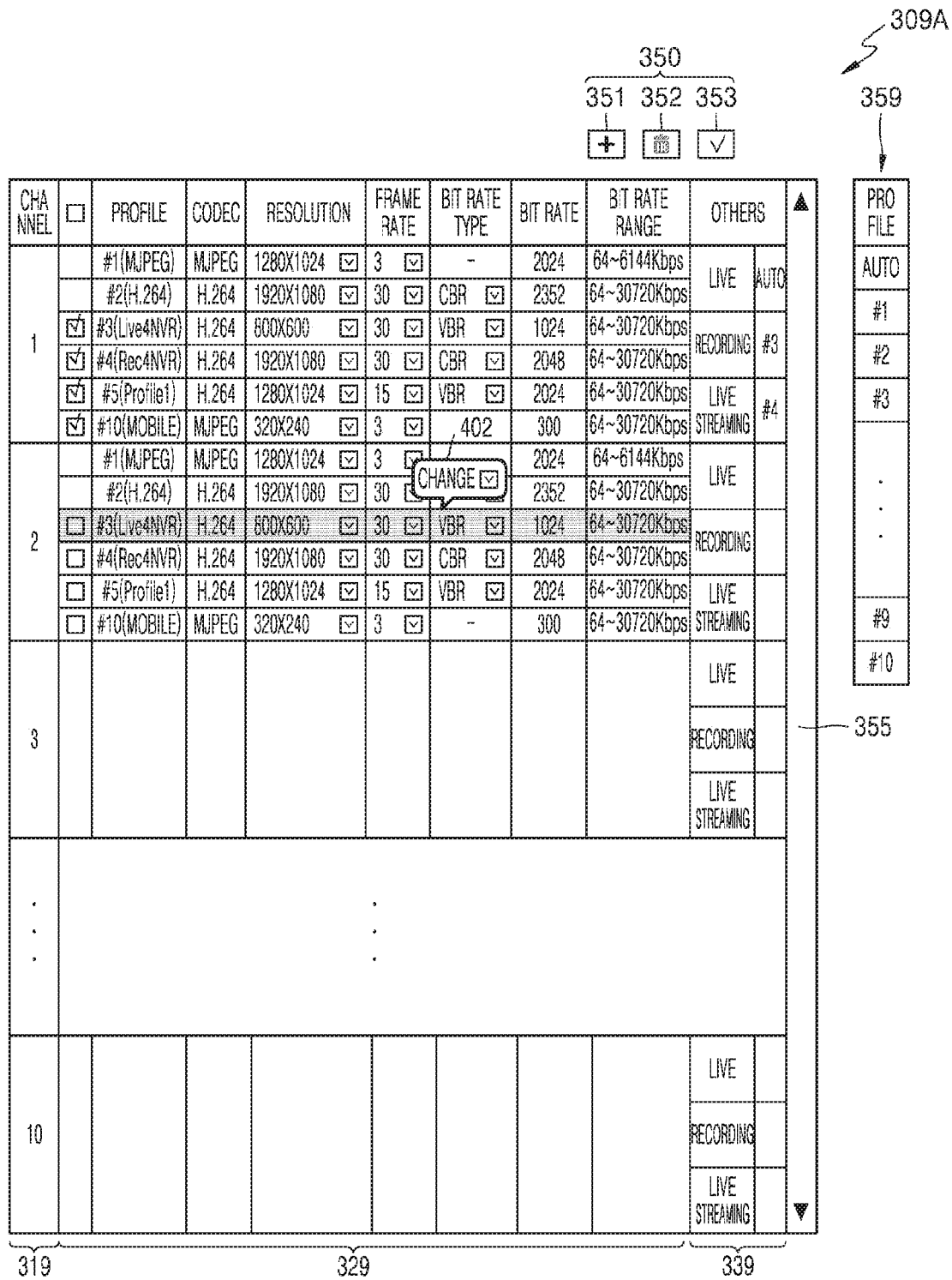

Referring to FIG. 7E, the processor 302 may determine whether a non-supported profile is set based on the capability of the camera, and may display, in the second region 329, an identification mark notifying to the user that the camera 100 does not support a profile. The identification mark may include a highlight mark, a shaded mark, and/or the like. In one exemplary embodiment, when the user copies the multi-profile displayed in the second region 329 of the first channel and pastes the copied multi-profile to the second region 329 of the second channel, the processor 302 may determine whether a non-supported profile of the camera registered on the second channel is present in the multi-profile of the first channel based on the capability of the camera registered on the second channel, and may shade the non-supported profile. A window 402 for inquiring whether to change the profile attribute may be displayed around the shaded non-supported profile in an overlapped manner. When the user selects the change, the attribute that is set to a value not supported by the corresponding camera among the attributes of the non-supported profile may be changed to a minimum value.

FIG. 8 is an example of a multi-profile setting using a setting UI 309B, according to another exemplary embodiment.

Referring to FIG. 8, the setting UI 309B may further include a fifth region 259 between the first region 319 and the second region 329 in the setting UI 309A illustrated in FIG. 7A. The functions described with reference to FIGS. 7A to 7E may be equally applied to the setting UI 309B.

The fifth region 259 is a region for selecting a channel to which the same multi-profile is applied. As illustrated in FIG. 8, the user may use the multi-profile, which is set to the first channel, as the candidate profile set of the selected second, third, and tenth channels. When the user copies the multi-profile displayed in the second region 329 of the first channel and pastes the copied multi-profile to the second region 329 of the other channel, the multi-profile displayed in the first channel may be collectively displayed as the candidate profile set in the second region 329 of the selected second, third, and tenth channels. The copy and paste function may be performed by a drag and drop operation.

Figure 9:
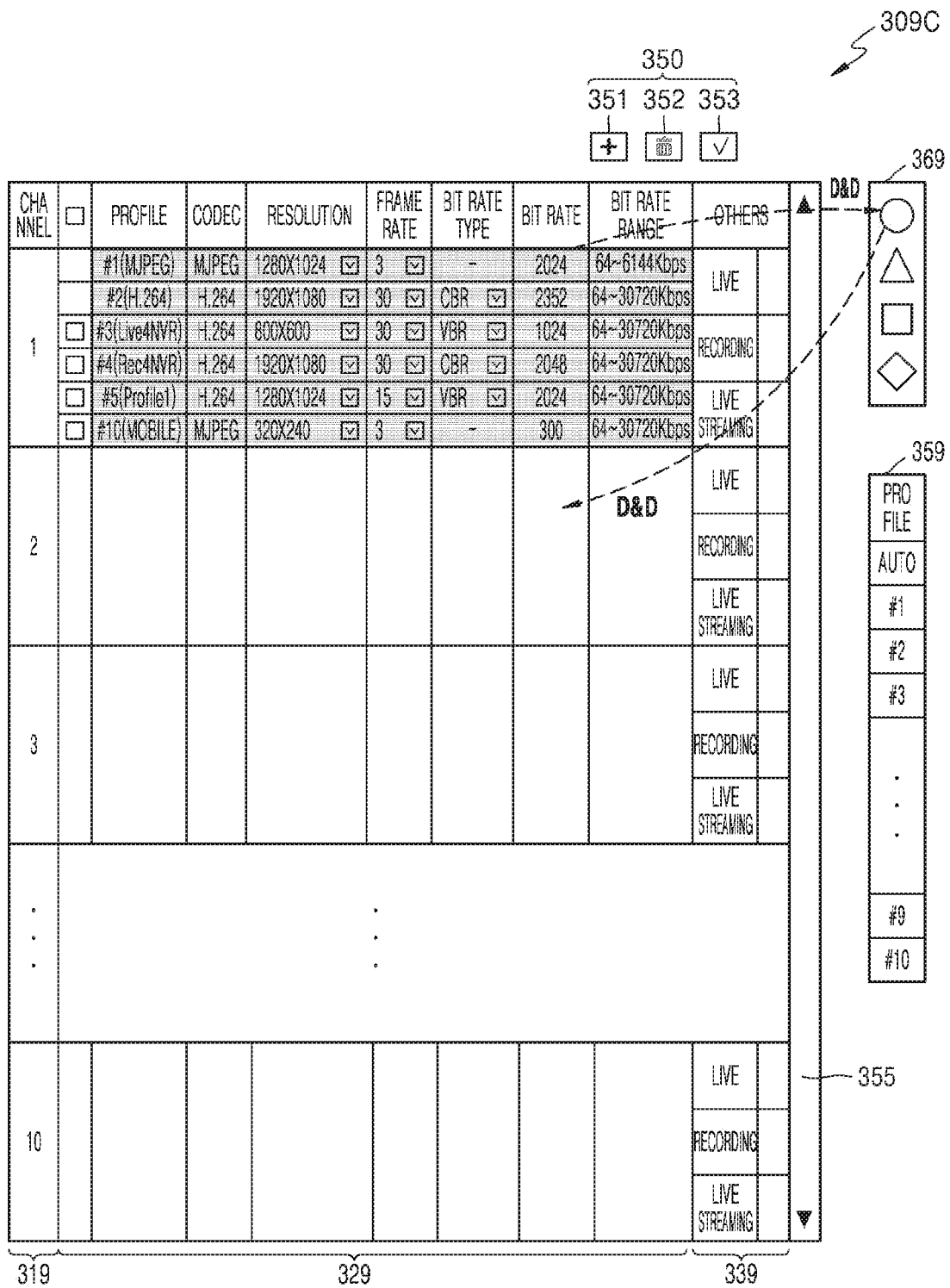

FIG. 9 is an example of a multi-profile setting using a setting UI 309C, according to another exemplary embodiment.

Referring to FIG. 9, the setting UI 309C may further include a sixth region 369 in the setting UI 309A illustrated in FIG. 7A. The functions described with reference to FIGS. 7A to 7E may be equally applied to the setting UI 309C.

The sixth region 369 may be a set of folders in which a profile set may be temporarily stored. Each of the folders may be displayed with a figure icon. In FIG. 9, a set of four icons, that is, a circular icon, a triangular icon, a square icon, and a rhombus icon, are illustrated as an example. The profile set temporarily stored in each of the folders may be overwritten with another profile set, or may be deleted.

The user may copy the multi-profile of an arbitrary channel and paste the copied multi-profile to an arbitrary icon of the sixth region 369. For example, when the user selects the multi-profile displayed in the second region 329 of the first channel and drags and drops the selected multi-profile to the circular icon of the sixth region 369, information of the multi-profile displayed in the second region 329 of the first channel may be temporarily stored in the folder displayed with the circular icon.

The user may drag and drop the circular icon of the sixth region 369 to the second region 329 of the second channel, so that the multi-profile information of the first channel stored in the folder displayed with the circular icon may be displayed as the candidate profile set in the second region 329 of the second channel.

Figure 10:
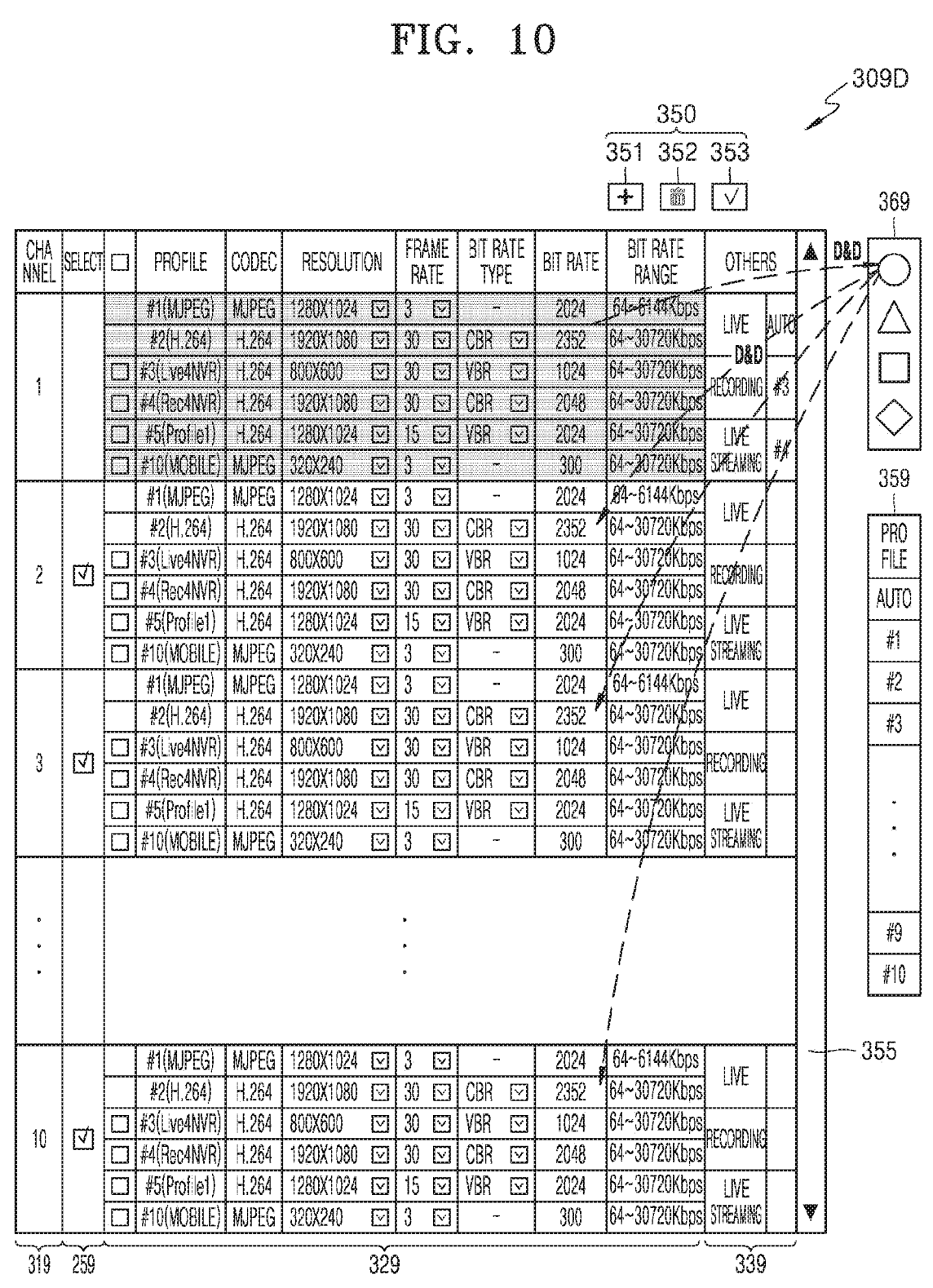

FIG. 10 is an example of a multi-profile setting using a setting UI 309D, according to another exemplary embodiment.

Referring to FIG. 10, the setting UI 309D may further include a fifth region 259 in the setting UI 309C illustrated in FIG. 9. The functions described with reference to FIGS. 7A to 7E and 9 may be equally applied to the setting UI 309D.

The fifth region 259 is a region for selecting a channel to which the same multi-profile is applied.

The user may use the multi-profile, which is set to the first channel, as the candidate profile set of the selected second, third, and tenth channels. The user may copy the profiles displayed in the second region 329 of the first channel and paste the copied profiles to an arbitrary icon in the sixth region 369. For example, when the user selects the multi-profile displayed in the second region 329 of the first channel and drags and drops the selected multi-profile to the circular icon of the sixth region 369, information of the multi-profile displayed in the second region 329 of the first channel may be temporarily stored in the folder displayed with the circular icon.

The user may drag and drop the circular icon of the sixth region 369 to the second region 329 of another channel, so that the multi-profile of the first channel stored in the folder displayed with the circular icon may be collectively displayed as the candidate profile set in the second region 329 of the selected second, third, and tenth channels.

The processor according to one exemplary embodiment may recommend at least one other channel, to which a candidate profile set recommended for an arbitrary channel is applicable, based on capability information of the cameras registered on the plurality of channels through the setting UIs 309A to 309D.

In the above-described exemplary embodiments, the case is described where the settings of the camera and the management apparatus are performed together in the setting UI. However, the exemplary embodiments are not limited thereto, and the setting UIs 309A to 309D may include only the multi-profile setting regions 329 and 369 of the camera, while the profile setting regions 339 and 359 of the management apparatus are omitted.

The setting UIs 309A to 309D according to the exemplary embodiments may set the multi profile setting of the camera and the profile setting for the recording and/or the live reproduction of the management apparatus in one window. Therefore, since the user need not find and set the corresponding menu a plurality of times, the profiles of the camera and the management apparatus may be set and operated in an easy and convenient manner.

According to one or more exemplary embodiments, the camera and/or the management apparatus may be set on one screen by using the user interface in an easy and convenient manner, thereby enabling the user-centered apparatus setting.

The camera setting control methods according to the exemplary embodiments may be embodied as computer-readable codes on a non-transitory computer-readable recording medium. The non-transitory computer-readable recording medium may be any recording medium that may store data which is thereafter readable by a computer system. Examples of the non-transitory computer-readable recording medium include read-only memory (ROM), random-access memory (RAM), CD-ROMs, magnetic tapes, floppy disks, and optical data storage devices. The computer-readable recording medium may also be distributed over network-coupled computer systems so that the computer-readable code is stored and executed in a distributed fashion. Also, functional programs, codes, and code segments for implementing the present disclosure may be easily construed by programmers skilled in the art to.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A setting system for a camera comprising:
a non-transitory storage medium having stored thereon processor-executable instructions;
a display; and
a processor configured to execute the processor-executable instructions to:
provide a user interface on the display having a first region for setting a multi-profile of a camera registered on each of a plurality of channels and a second region for setting a reception profile of a management apparatus connected to the camera on each of the plurality of channels;
recommend a candidate profile set settable to a camera registered on a first channel selected from among the plurality of channels, to a first region of the first channel, and set a multi-profile for the camera registered on the first channel, the multi-profile being determined as a result of editing profiles constituting the candidate profile set; and
provide a multi-profile of the first channel to a first region of at least one other channel as a candidate profile set of a camera registered on the at least one other channel that is different from the first channel, and
wherein each of a plurality of profiles in the multi-profile for a camera defines a set codec, a resolution, a frame rate, and a bit rate or bit rate range.

2. The setting system of claim 1, wherein the processor is configured to provide, to the user interface, a function of copying and pasting a multi-profile displayed in the first region of the first channel to a first region of the at least one other channel.

3. The setting system of claim 1, wherein the user interface comprises a third region for providing a profile set, and
the processor is further configured to provide, to the user interface, a function of copying and pasting a profile, which is selected from among the profile set provided in the third region, to the second region.

4. The setting system of claim 1, wherein the processor is further configured to:
display an identification mark on a non-supported profile not supported by the camera registered on the at least one other channel, the non-supported profile being among the profiles constituting the candidate profile set displayed in the first region of the at least one other channel; and
change at least one value of attributes of the non-supported profile to a minimum value in response to a user request.

5. The setting system of claim 1, wherein the processor is further configured to provide information of a camera registered on a channel selected from among the plurality of channels.

6. The setting system of claim 1, wherein the processor is further configured to provide, to the user interface, a preview image to which a profile selected from among the profiles constituting the candidate profile set is applied.

7. The setting system of claim 1, wherein the user interface comprises a fourth area for providing a folder set capable of temporarily storing the profile set, and the processor is further configured to provide, to the user interface, a function of copying and pasting a profile set selected in the first region to a folder selected from among the folder set.

8. The setting system of claim 7, wherein the processor is further configured to provide, to the user interface, a function of copying and pasting the profile set, which is temporarily stored in the folder selected from among the folder set, to the first region of the at least one other channel.

9. The setting system of claim 1, wherein the processor is further configured to recommend, based on capability information of the cameras registered on the plurality of channels, at least one other channel to which the candidate profile set recommended to the first channel is applicable.

10. A method of controlling setting of a device, the method being performed by a setting system, the method comprising the steps of:
providing a user interface on a display, the user interface having a first region for setting a multi-profile of a camera registered on each of a plurality of channels and a second region for setting a reception profile of a management apparatus connected to the camera on each of the plurality of channels;
recommending a candidate profile set, which is settable to a camera registered on a first channel selected from among the plurality of channels, to a first region of the first channel, and setting a multi-profile for the camera registered on the first channel, the multi-profile being determined as a result of editing profiles constituting the candidate profile set; and
providing a multi-profile of the first channel to a first region of at least one other channel as a candidate profile set of a camera registered on the at least one other channel that is different from the first channel, and
wherein each of a plurality of profiles in the multi-profile for a camera defines a set codec, a resolution, a frame rate, and a bit rate or bit rate range.

11. The method of claim 10, wherein the step of providing of the multi-profile of the first channel to the first region of the at least one other channel as the candidate profile set comprises the step of providing the multi-profile of the first channel to the first region of the at least one other channel as the candidate profile set in response to a request for a function of copying and pasting a multi-profile displayed in the first region of the first channel to the first region of the at least one other channel.

12. The method of claim 10, wherein the user interface has a third region for providing a profile set, and the method further comprises the step of:
setting a reception profile of the management apparatus in response to a function of copying and pasting a profile, which is selected from among a profile set provided in the third region, to the second region.

13. The method of claim 12, further comprising the steps of:
displaying an identification mark on a non-supported profile not supported by the camera registered on the at least one other channel, the non-supported profile being among the profiles constituting the candidate profile set displayed in the first region of the at least one other channel; and
changing at least one value of attributes of the non-supported profile to a minimum value.

14. The method of claim 10, further comprising the step of:
providing information, overlapped on the user interface, of a camera registered on a channel selected from among the plurality of channels.

15. The method of claim 10, further comprising the step of:
providing a preview image to which a profile selected from among the profiles constituting the candidate profile set is applied.

16. The method of claim 10, wherein the user interface comprises a fourth area for providing a folder set capable of temporarily storing the profile set, and
the method further comprises the step of:
temporarily storing a profile set, which is selected in the first region, in a folder, which is selected from among the folder set, in response to a request for a function of copying and pasting the selected profile set to the selected folder.

17. The method of claim 16, further comprising the step of:
providing the profile set, which is temporarily stored in the folder selected from among the folder set, to the first region of the at least one other channel in response to a request for a function of copying and pasting the temporarily stored profile set to the first region of the at least one other channel.

18. The method of claim 10, further comprising the step of:
recommending, based on capability information of the cameras registered on the plurality of channels, at least one other channel to which the candidate profile set recommended to the first channel is applicable.

* * * * *